Dec. 26, 1939.     H. M. AUSTIN ET AL     2,184,482
VIBRATION ABSORBING COMPOSITION AND STRUCTURE EMBODYING THE SAME
Filed May 15, 1936     2 Sheets—Sheet 1
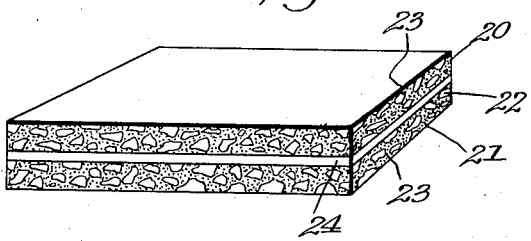
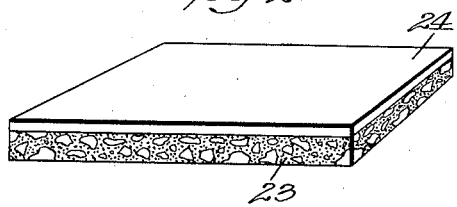
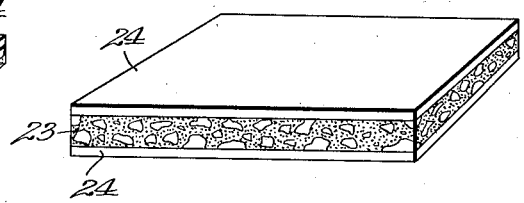
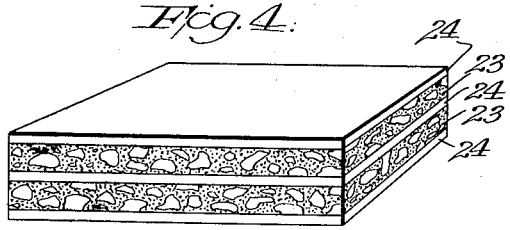
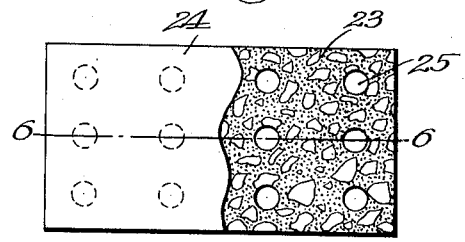
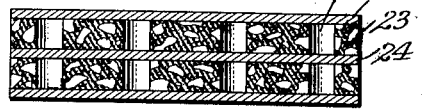
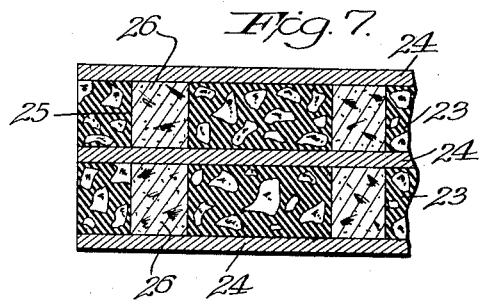
Inventors
Harry H. Austin,
James A. Muir,
By Cushman, Darby & Cushman
Attorneys Dec. 26, 1939.   H. M. AUSTIN ET AL   2,184,482
VIBRATION ABSORBING COMPOSITION AND STRUCTURE EMBODYING THE SAME
Filed May 15, 1936   2 Sheets-Sheet 2
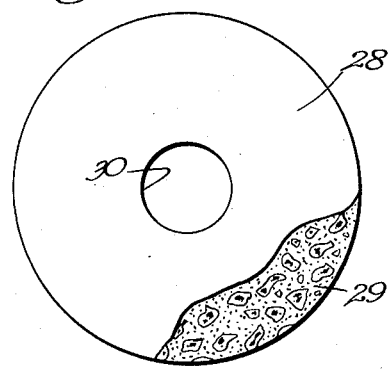
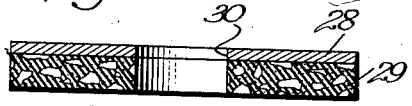
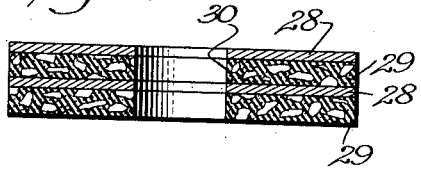
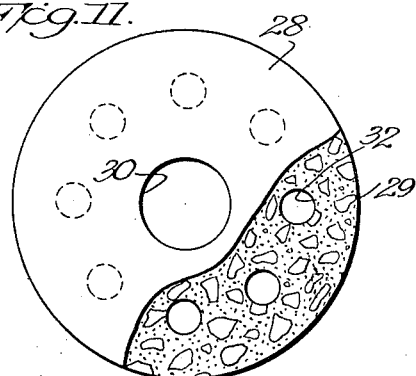
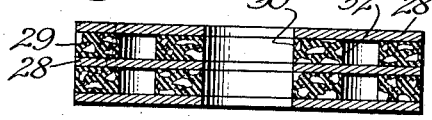
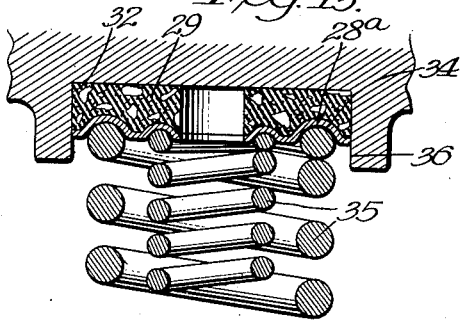
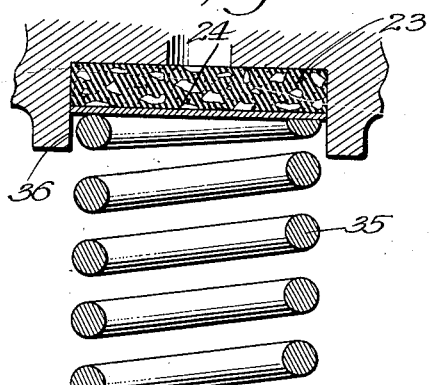
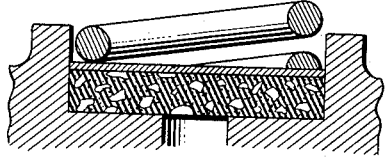
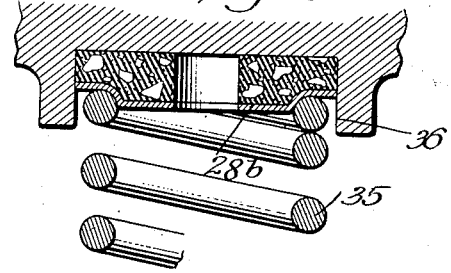
Inventors
Harry H. Austin,
James A. Muir,
By Cushman, Darby & Cushman
Attorneys Patented Dec. 26, 1939

2,184,482

UNITED STATES PATENT OFFICE 2,184,482

VIBRATION ABSORBING COMPOSITION AND STRUCTURE EMBODYING THE SAME

Harry M. Austin and James A. Muir, Baltimore, Md., assignors to Crown Cork & Seal Company, Inc., Baltimore, Md., a corporation of New York Application May 15, 1936, Serial No. 80,017

2 Claims. (Cl. 154—44)

The present invention relates to vibration absorbing compositions, and structures embodying the same.

The principal object of the invention is to provide a vibration absorbing composition which will be capable of use for many purposes and in numerous locations for which such types of compositions, as heretofore produced, were not adapted.

At the present time, rubber compounds and other resilient materials are widely used for vibration absorbing purposes, but these materials are ordinarily dense and their compressibility is therefore limited. For example, rubber is not bodily compressible, that is, it is not compressible upon itself. Therefore, when a body of rubber is positioned in a confined space between two relatively movable elements, it may only be compressed to a very limited degree, since, before it may be compressed in one direction, it must be free to expand in another direction. This has necessitated that the means for securing the rubber between the two elements must include space for deflection of the rubber, resulting in possible and undesirable transverse movement of one element with respect to the other. Rubber is also subject to the objection that the degree of resiliency which may be imparted thereto during vulcanization or other usual treatment is not readily or widely variable to an optimum degree.

The composition of our invention comprises a body of rubber, or a rubber-like substance, having particles of cork or other bodily compressible material interspersed therein to give improved characteristics of elasticity or resiliency. For example, if the composition is formed of a body of rubber having particles of cork interspersed therein, the presence of the cork, which includes air cells or voids to the proportion of substantially fifty per cent of its volume, will permit the rubber to be deflected under pressure into or upon the cork particles. Also, the random positioning in the rubber of particles of a substance having a periodicity of vibration different from that of rubber, will tend to cause the period of vibration or harmonics to be varied throughout the entire mass of the composition.

Another object of the invention is to provide a structure including a vibration absorbing composition preferably having the characteristics discussed above, and which structure is so designed that the absorption characteristics of the composition and its range of use will be greatly increased.

In order to attain this latter object, a member or lamina formed of the vibration absorbing material is secured to a rigid member or lamina preferably having the same outline as the resilient member. When the entire structure is subjected to pressure, such pressure will be evenly distributed over the entire area and through the entire mass of the resilient member so that full advantage will be taken of the differences in periodicity of vibration and harmonics resulting from the interspersion in the non-bodily compressible material of the bodily compressible particles.

In another form of the invention, both the rigid and resilient members are provided with a substantially centrally arranged aperture. This permits the resilient member to be bodily deflected inwardly beyond its ordinary confines, thereby increasing the capabilities of deflection already provided for by the interspersion of bodily compressible particles in the resilient member.

In a still further form of the invention, apertures are provided in the resilient member or composition alone, which apertures may either be empty or filled with a bodily compressible material, all for the purpose of permitting the resilient member to have an increased degree of deflection within its bodily confines.

The composition and structures of the invention are adapted to be used in supporting all types of apparatus and structures, machinery and railway car bodies being only a limited example of their possible use. Obviously, the material and structures may also be used in walls, floors and other portions of building structures to obtain desired reduction of vibration, including the deadening of sound.

Other objects, advantages and uses of the invention will be apparent from the following drawings, wherein Figures 1 to 4 are perspective views showing various forms of the invention as embodied in rigid and resilient members secured together;

Figure 5 is a plan view of a form of the invention wherein the resilient composition is provided with apertures;

Figure 6 is a sectional view taken on the line 6—6 of Figure 5;

Figure 7 is a sectional view showing the use of bodily compressible inserts in the resilient lamina of the invention;

Figure 8 is a plan view of a structural member embodying the invention and provided with a central aperture;

Figure 9 is a sectional view of the structure shown in Figure 8;

Figure 10 is a view similar to Figure 9 of a structural element generally similar to that shown in Figure 8, but embodying a greater number of laminae;

Figure 11 is a view in plan, with portions broken away, of a structural element of the type shown in Figure 8, but with the resilient laminae provided with additional apertures;

Figure 12 is a sectional view of the structure shown in Figure 11; and

Figures 13, 14 and 15 show the invention embodied in various forms of spring bearing structures.

Referring to Figure 1, the numeral 20 designates a body formed of the composition of the present invention, which comprises a mass 21 of rubber or rubber-like substance or any substance having vibration absorbing qualities, and having particles 22 of cork or other bodily compressible material interspersed therein. The composition 20 may be formed by mixing the substance forming the body 21 with the particles 22 while the mass 21 is in a soft condition, and then vulcanizing the entire body under heat and while subjected to a pressure substantially equal to that to which the composition will be subjected when in use for the purpose for which it is designed. It will be understood that the resilient characteristics of the mass 21 may vary to a wide degree, according to the purpose for which the body 20 is to be used, and that the number and size of the particles 22 may also be varied in accordance with the same requirements. Since cork is a vibration absorbing material, the size and number of the particles may be widely varied without ordinarily reducing the vibration absorption qualities of the body.

In use, the body 20 will have numerous advantages over the ordinary forms of vibration absorbing materials, in that the non-bodily compressible mass 21 may be compressed or deflected into, or upon, the bodily compressible particles 22. Also, the interspersed particles 22 will cause the periodicity of vibration and the harmonics of the mass 21, and therefore of the entire composition 20, to vary throughout the entire area of the body thereof.

In the drawings, the composition or body 20 is disclosed as being combined with rigid members, hereinafter described.

However, it will be understood that the composition may be used alone for numerous purposes, the structures disclosed in the drawings and including the composition being designed to increase its range of use.

Figure 1 discloses a pair of laminae 23 formed of the composition 20 and each secured to a face of a rigid element 24 also of laminar form. The rigid element 24 may be formed of stiff fiber or Bakelite, which is a synthetic resinous material, or of any suitable stiff or rigid sound deadening material and the resilient laminae 23 are secured thereto by vulcanization, or by an adhesive or in any other suitable manner so as to obtain a thorough and even load distribution. The structure shown in Figure 1, like the structures shown in Figures 2 to 4, is particularly intended to be interposed between two bodies or structures, one of which is to be supported so as to be free for vibration with respect to the other. By positioning a resilient lamina 23 on both the upper and lower surfaces of the structure shown in Figure 1, the structure may be confined between two relatively rough or unmachined surfaces.

With the structure of Figure 1, as well as in the hereinafter described structures involving the use of a plurality of resilient laminae with an interposed rigid lamina, the degree of deflection and also the possibility of extrusion in unconfined positions, will be reduced. Load distribution will also be effected to the optimum degree.

The construction shown in Figure 2 is provided with but one resilient lamina 23 and a rigid lamina 24. This structure would be used in a location wherein one of the opposing surfaces between which the structure is positioned is smooth and the other surface rough, the resilient lamina being positioned to abut against the rougher surface. The structure shown in Figure 3 is intended to be used between two smooth or machined surfaces and comprises upper and lower rigid laminae 24 and an interposed resilient lamina 23. Figure 4 shows a further modification wherein rigid laminae 24 are provided on the upper and lower surfaces of the structure and a third rigid lamina 24 is provided in an intermediate position, the latter lamina being insulated from the upper and lower laminae by a resilient lamina 23 on each side thereof.

Figure 5 illustrates a modification of the structures shown in Figures 1 to 4, in that apertures 25 are provided in the resilient laminae, these apertures preferably being spaced according to some geometrical plan. The provision of the apertures in the resilient laminae permits the latter to have a greater range of deflection. While all of the structures referred to herein have a marked increased degree of deflection and resiliency over any similar structure formed only of a non-bodily compressible material, the provision of apertures in the resilient laminae greatly increases the range of possible deflection and thereby likewise increases the resiliency of the structure. Figure 7 illustrates the use of inserts 26 of a bodily compressible material such as cork, as shown, and which may have a higher degree of resiliency than the non-bodily compressible material positioned in the apertures 25 of the resilient lamina 23. The provision of such inserts decreases the deflection of the lamina to a certain degree, and this structure thereby permits the range of resiliency to be further varied during manufacture, and according to the use for which the structure is designed.

Further modifications of the structures of the invention are shown in Figures 8 to 12. Figures 8 and 9 show a circular lamina 28 which may be formed of the same materials as the rigid lamina 24 of Figure 1, lamina 28 being adhesively or otherwise suitably secured or affixed to a circular resilient lamina 29 of the composition 20. The use of circular laminae results in the provision of a central aperture 30 permitting increased deflection of the resilient lamina.

The structure of Figure 10, comprising alternate resilient and rigid lamina and provided with a central aperture 30, is a variation of the Figure 8 construction adapted to have greater carrying capacity than the construction shown in Figures 8 and 9.

The construction shown in Figures 11 and 12 is similar to that of Figures 8 and 9, except that a plurality of apertures 32 are spaced about the central aperture 30, the apertures 32 only extending through the resilient laminae. The spacing of the apertures 32 is preferably in circumferential series. The use of the apertures 32 in the resilient laminae and the central aperture 30 extending entirely through the structure permits of a minimum quantity of cork or other bodily compressible material, or the use of the last named material in the form of smaller particles.

If desired, the apertures 32 of Figures 11 and 12 may be filled with bodily compressible inserts of the type shown in Figure 7. It will be understood, also, that for some purposes, a body of rubber or other non-bodily compressible material provided with apertures such as 32 filled with bodily compressible inserts will give the desired degree of resiliency.

The use of rigid laminae is not necessary in any of the structures described above, since it is found that the body 20, of whatever shape, or with or without apertures, will serve as a proper supporting element in numerous installations.

Figure 13 discloses a modification of the construction shown in Figures 8 and 9, and which is particularly adapted for use as a spring mounting. In this construction, the rigid lamina 28a is provided with circumferential grooves 34, in which may be seated the ends of coil springs indicated at 35. The entire vibration absorbing member would be seated in a socket 36 having substantially the same diameter as the structure itself. By this arrangement, there can be no lateral movement transmitted to the spring by the vibration absorbing element, but a full degree of the desired deflection or resiliency will be obtained.

Figure 14 shows the use of non-apertured vibration absorbing structures of the type shown in Figure 2 but round in outline. These structures are positioned in a confined socket 36 and with the ends of a spring 35 bearing against the rigid lamina 24. Figure 15 discloses a construction generally similar to that of Figure 13, except that the rigid element 28b is circularly stepped in form so that its central portion may project slightly into the coils of the spring to center the latter and prevent lateral movement thereof.

It will be understood that the constructions disclosed in Figures 13, 14 and 15 are merely presented to show one limited application of the use of the invention.

Because of the increased deflection permitted by the structures provided with central apertures or with apertures in the resilient laminae alone, these structures may include resilient laminae including a minimum number of bodily compressible particles, or of extremely small particles. In some instances, the use of bodily compressible particles in the apertured structures may be entirely eliminated, due to the range of internal deflection permitted by these structures.

We claim:—

1. A vibration absorbing structure including a resilient lamina comprising a mass of rubber-like material having cork particles of greater resiliency than said mass interspersed therein, said resilient lamina having at least one aperture therethrough extending substantially at right angles to the plane thereof, and a relatively stiff lamina directly secured to the resilient lamina and substantially coextensive therewith, said stiff lamina comprising a synthetic resinous sound deadening material and being sufficiently rigid to distribute load throughout the resilient lamina.

2. In a vibration absorbing body, a mass of resilient material comprising cork particles and rubber, said mass having an aperture therein, and a body of bodily compressible cork positioned in the aperture.

HARRY M. AUSTIN.
JAMES A. MUIR.